(No Model.)
W. T. BUDDS.
ELECTRIC CALL BOX SYSTEM.
No. 598,853. Patented Feb. 8, 1898.
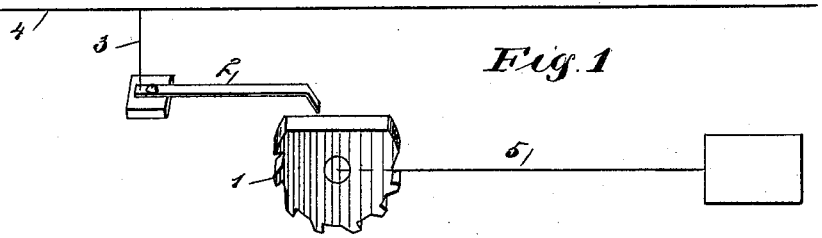
*Fig. 1*
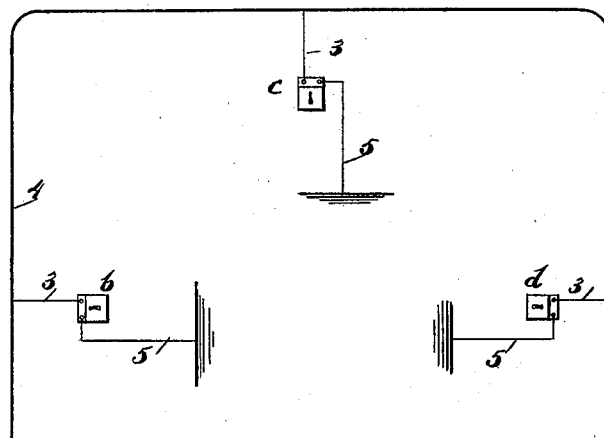
*Fig. 2*
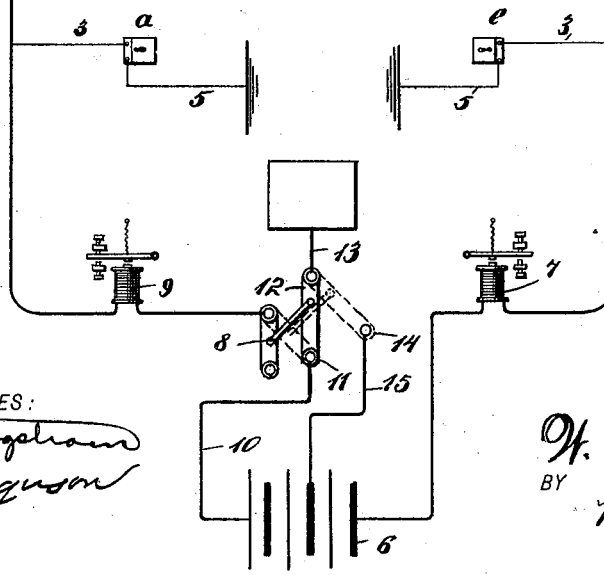
WITNESSES:
INVENTOR
W. T. Budds
BY
ATTORNEYS.

UNITED STATES PATENT OFFICE.

WILLIAM T. BUDDS, OF CHARLESTON, SOUTH CAROLINA.

ELECTRIC CALL-BOX SYSTEM.

SPECIFICATION forming part of Letters Patent No. 598,853, dated February 8, 1898.

Application filed August 23, 1897. Serial No. 649,178. (No model.)

*To all whom it may concern:*

Be it known that I, WILLIAM T. BUDDS, of Charleston, in the county of Charleston and State of South Carolina, have invented a new and Improved Electric Call-Box System, of which the following is a full, clear, and exact description.

This invention relates to electric call-box systems or circuits; and the object is to provide a single-wire open-main circuit having a single-wire connection with each call-box, the circuit being completed through the ground, A further object is to so arrange the circuit that a break in the line may be easily and quickly located from the central office, thus dispensing with the services of linemen or inspectors.

I will describe an electric call-box system embodying my invention, and then point out the novel features in the appended claim.

Reference is to be had to the accompanying drawings, forming a part of this specification, in which similar characters of reference indicate corresponding parts in both views.

Figure 1 is a perspective view of a controlling device employed in a call-box, and Fig. 2 is a diagrammatic view of a system embodying my invention.

The controlling device comprises a segment 1, arranged on a rocking shaft in a call-box in the usual manner. This segment is provided with projections on its periphery for closing the call and indicating the number of the box at the central office. Coacting with the segment 1 is a brush 2, and from this brush a wire 3 extends to a connection with the main wire 4, and from the segment 1 or from the frame of the box which is in electrical connection with the segment a ground-wire 5 extends to the ground connection. This order, of course, may be reversed—that is, the ground-wire may extend from the brush and the wire leading from the main wire may extend from the frame or segment.

It will be noted that the flat portion of the segment is opposite the end of the brush 2 when the call-box is in its inoperative position, the circuit only being closed when the call-box 1 is rotated to engage its projections with the brush.

In Fig. 2 I have shown a number of call-boxes *a, b, c, d,* and *e,* all connected with the wire 4. One end of the wire 4 connects with one pole of the battery 6 at the central office, and in this portion of the wire a call instrument 7 is arranged. The other end of the wire connects with a switch 8, and in this portion of the wire is a call instrument 9, which is normally cut out of the circuit. From the opposite pole of the battery 6 a wire 10 extends to a contact-piece 11, adapted to be engaged by a switch-arm 12, connecting with a ground-wire 13. The switch 8 is also designed to be engaged with the contact 11 under certain conditions, as will be hereinafter explained, and the switch 12 is designed to be engaged by the contact-point 14, having a wire 15 extending to a central element of the battery. The switches 8 and 12 may be conveniently connected together, as shown, so as to swing in unison.

In operation the wire 10, leading from the battery, will normally be grounded. Should a call be sent in from one of the outlying call-boxes, the current will be through the wire 3, the wire 4, the instrument 7, the battery 6, the wire 10, through the ground, and the wire 5 back to the call-box. Should the system fail to work while in this condition, such as by a breakage in the wire 4, the break may be quickly located as follows: The instrument 9 will be cut in by shifting the switch 8 into engagement with the wire 10 and the switch 12 into engagement with the wire 15, leading to the center of the battery. This, of course, will throw a portion of the battery to the ground. Assuming the break to be between the boxes *d* and *e,* both boxes would register, box *d* making the circuit through ground 5, through box *d,* to wire 3, to main wire 4, to instrument 9, to battery, thence to tap-ground. Box *e* makes circuit through 5 to box, to wire 3, to main wire 4, to instrument 7, to battery 6, to tap-ground. If, on the other hand, wire 3 breaks that leads from wire 4 to call-box, it would have no effect on the system except on that one box alone. If the party who has box *a* with wire 3 broken notifies the main office that his call-box is out of order and a ground is placed on instrument 9 and wire closed, this would prove beyond a doubt that the trouble is local only, and it would be on wire leading from wire 4, which is the main wire, to the party who has the call-box in his office, thereby locating the trouble within a few feet without the aid of an experienced inspector or lineman.

In case of trouble, take the end of the battery which goes to the ground and put it in the middle of the battery, thus tapping the battery in the middle, and at the same time cut in instrument 9. This will allow the battery to flow to both sides through both instruments 7 and 9 to main wire, to the different boxes to the break. When the box is pulled, the box grounds itself, and the home ends being grounded through the tap of the battery makes a full circuit.

If count is kept as to which instrument the calls come in from and $d$ came in on instrument 9 and $e$ on instrument 7, this would show beyond a doubt that the break was between $d$ and $e$, but would not interfere with the calls coming in.

It will be seen that this system will be very cheap in construction, safe as regards trouble, economical in its battery service, and also that as only one wire is used to cut in a call-box with the main line there will be no interruption of the circuit while a new box is being connected with the line or an old box taken out of the building. As this is an open-circuit system, the battery is only in use when a box is full, thereby saving one-half or two-thirds of the battery as compared with the old system having a closed circuit.

Having thus described my invention, I claim as new and desire to secure by Letters Patent—

A call-box system, comprising a main wire, call-boxes having a shunt connection with the main wire and also having a ground connection, a battery with one pole of which one end of the main wire connects, a wire leading from the other pole of the battery, a switch for connecting the last-named wire with a ground-wire, a switch for connecting the last-named wire with the main wire, the first-named switch also operating to connect the ground-wire with an intermediate element of the battery, and a sounding device in each extremity of the main wire, substantially as specified.

WILLIAM T. BUDDS.

Witnesses:
J. M. HANLEY,
F. K. MYERS.